J. R. PERKINS.
NUT LOCK.
APPLICATION FILED JUNE 22, 1909.
952,942.
Patented Mar. 22, 1910.
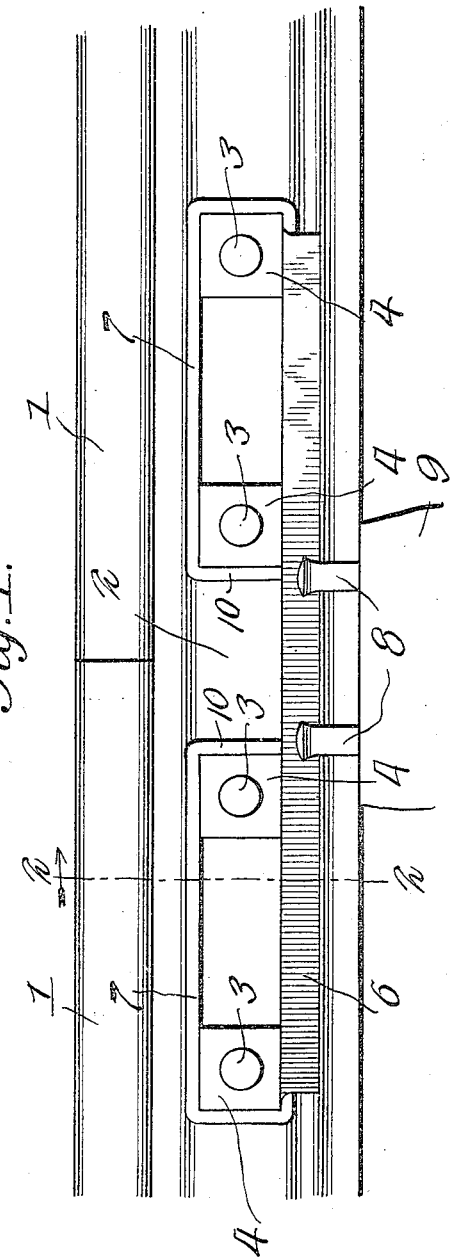
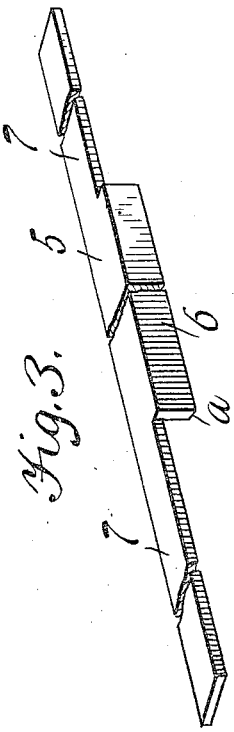
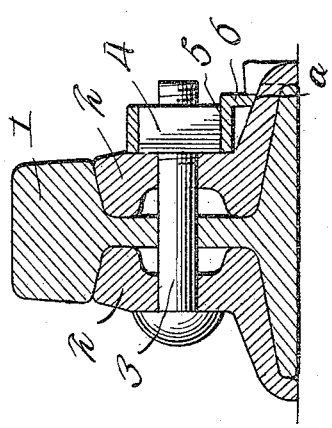
Witnesses
Inventor
John R. Perkins
By Victor J. Evans
Attorney

UNITED STATES PATENT OFFICE.

JOHN ROBINSON PERKINS, OF JACKSON, MISSISSIPPI.

NUT-LOCK.

952,942.  Specification of Letters Patent.  Patented Mar. 22, 1910.

Application filed June 22, 1909. Serial No. 503,666.

*To all whom it may concern:*

Be it known that I, JOHN ROBINSON PERKINS, a citizen of the United States, residing at Jackson, in the county of Hinds and State of Mississippi, have invented new and useful Improvements in Nut-Locks, of which the following is a specification.

This invention relates to nut locks, designed more particularly for use in rail joints, but capable of utilization for other purposes, and one of the principal objects of the same is to provide a nut lock of simple construction which can be quickly applied to prevent the nuts from turning off the bolts and which will permit adjustment of the bolts whenever required.

Another object of the invention is to provide a nut lock made from a single piece of sheet metal bent to form a sustaining flange to bear against the upper surface of the base flange of the rails and provided with malleable members designed to be readily bent over the nuts after they have been properly adjusted, the entire nut lock being held in place by the spikes at the rail joints.

These and other objects may be attained by means of the construction illustrated in the accompanying drawing, in which:—

Figure 1 is a side elevation of the meeting ends of a pair of railway rails showing my nut lock in position for preventing the nuts from turning off the bolts. Fig. 2 is a vertical sectional view on the line 2—2 of Fig. 1, looking in the direction indicated by the arrow. Fig. 3 is a detail perspective view of the nut lock before it is applied to the rail joint said nut lock being shown broken away at different points.

Referring to the drawing the numerals 1 designate the meeting ends of a pair of railway rails and 2 are the fish plates which may be of the usual or any preferred construction. The bolts 3 extend through the fish plates and through the webs of the rails 1 and applied to the threaded ends of the bolts are the nuts 4 preferably of rectangular form. My nut lock however may be used with polygonal nuts.

My nut lock is formed of a single piece of sheet material having a flat upper surface 5 and a centrally disposed down turned sustaining flange 6 and extended outward from the ends of the nut lock are malleable fingers 7 designed to be bent around the nuts for preventing them from turning off the bolt.

The manner of applying the nut lock may be briefly described as follows: After the nuts 4 have been adjusted upon the bolts 3 and before the spikes 8 have been driven into tie 9 at the joint, the nut lock is placed in position with the flange 6 bearing against the upper surface of the base flange of the fish plate 2. The malleable fingers 7 are then bent over the tops of the nuts and down at the inner sides of the nuts adjacent to the joint as at 10. In this position the spikes 8 are driven into the tie and the heads of the spikes bear against the sustaining flange 6 of the nut lock to securely hold the same in place. The lower edge of the sustaining flange 6 may be beveled at *a* to conform to the inclination of the base flange of the fish plate. Should it become necessary to readjust the nuts, this may be done by bending the fingers 7 back from the nuts and removing the nut lock.

From the foregoing it will be obvious that a nut lock made in accordance with my invention is simple in construction, efficient and reliable in use, can be manufactured at slight cost and can be quickly applied for its purpose.

Having thus described the invention what is claimed as new is:—

1. A nut lock comprising an elongated strip of metal, an extension at one edge of the strip and centrally of its length, and a depending supporting flange on the extension, the opposite ends of the strip being adapted to be bent vertically and horizontally to embrace two or more nuts.

2. In combination with a rail joint, a nut lock comprising a vertically arranged supporting web engaging on a fish plate, a horizontally disposed member engaging with the lower edges of the nuts and fingers on the opposite ends of the horizontal member, adapted to be bent upward to engage the outer edges of the nuts and horizontally and perpendicularly to engage the upper and inner faces of the nuts, the extremities of said fingers engaging with the horizontally disposed member.

In testimony whereof I affix my signature in presence of two witnesses.

JOHN ROBINSON PERKINS.

Witnesses:
WM. H. THOMSON,
EDWARD L. PATTON.